Patented May 2, 1939

2,156,724

UNITED STATES PATENT OFFICE 2,156,724

SECONDARY ETHERS OF POLYHYDRIC ALCOHOLS

Theodore W. Evans, Berkeley, and Edwin F. Bullard, Oakland, Calif., assignors to Shell Development Company, San Francisco, Calif., a corporation of Delaware No Drawing. Original application December 12, 1936, Serial No. 115,636. Divided and this application February 11, 1938, Serial No. 190,029

8 Claims. (Cl. 260—615)

This invention relates to new chemical compounds and more particularly to new aliphatic trihydric alcohol ethers characterized by the substitution of an alkoxy group of an aliphatic secondary alcohol for at least one of the hydroxy groups of the trihydric alcohol.

An object of the invention is to provide a novel class of secondary ethers of trihydric alcohols which have value for a great many technical uses and are also valuable as intermediates in the preparation of useful trihydric alcohols and other derivatives thereof. A further object of the invention lies in the preparation of new intermediates from which the herein disclosed ethers may be readily prepared.

Secondary ethers of polyhydric alcohols of the class consisting of aliphatic trihydric alcohols, one hydroxy group of which has been substituted by the alkoxy group of an aliphatic secondary alcohol; aliphatic trihydric alcohols, two hydroxy groups of which have been substituted by the alkoxy groups of aliphatic secondary alcohols, at least one of said alkoxy groups containing at least four carbon atoms; and aliphatic trihydric alcohols, each hydroxy group of which has been substituted by the alkoxy group of an aliphatic secondary alcohol, have been prepared and described for the first time.

The invention is described with particular reference to the secondary ethers of the glycerols, the term "glycerol" embracing, in addition to glycerol, its homologues, analogues and trihydric substitution products. Secondary monoethers of glycerols, which are embraced within the scope of the invention, include, among others, the following: alpha isopropyl ether of glycerol, beta isopropyl ether of glycerol, alpha secondary butyl ether of glycerol, beta secondary butyl ether of glycerol, alpha secondary amyl ether of glycerol, beta secondary amyl ether of glycerol, the secondary hexyl ethers of glycerol, the secondary heptyl ethers of glycerol and the like and their homologues, analogues and suitable substitution products; alpha isopropyl ether of beta-methyl glycerol, beta isopropyl ether of beta-methyl glycerol, alpha secondary butyl ether of beta-methyl glycerol, beta secondary butyl ether of beta-methyl glycerol, alpha secondary amyl ether of beta-methyl glycerol, the secondary hexyl ethers of beta-methyl glycerol, the secondary heptyl ethers of beta-methyl glycerol and the like and their homologues, analogues and suitable substitution products; the isopropyl, secondary butyl, secondary amyl, secondary hexyl, secondary heptyl and the like monoethers of the beta-ethyl-, beta-propyl-, beta-hexyl- and the like glycerols; the isopropyl, secondary butyl, secondary amyl, secondary hexyl, secondary heptyl and the like monoethers of the alpha-methyl, alpha-ethyl-, alpha propyl and the like glycerols; as well as the secondary monoethers of the alpha alpha' substituted glycerols as alpha methyl, alpha'-ethyl glycerol, alpha beta substituted glycerols as alpha methyl, beta-methyl glycerol and the like.

It is seen that, in the above described novel compound, one hydroxy group of the trihydric alcohol has been replaced by the alkoxy group of an aliphatic secondary alcohol as isopropyl alcohol, secondary butyl alcohol, secondary amyl alcohol, etc. One or both of the other hydroxy groups may be substituted by the alkoxy, aralkoxy or aryloxy groups of primary or tertiary alcohols or of phenolic compounds, or by the negative radicals of aliphatic carboxylic acids, such as in alpha-methyl, alpha' secondary butyl diether of glycerol, allyl, secondary butyl diether of glycerol and phenyl, secondary butyl diether of glycerol.

Disecondary diethers of glycerols, which are within the scope of the invention, include, among others, the following: alpha isopropyl, alpha' secondary butyl diether of glycerol, alpha, beta diisopropyl diether of glycerol, alpha, alpha' disecondary butyl diether of glycerol, alpha isopropyl, alpha' secondary amyl diether of glycerol, alpha secondary butyl, alpha' secondary amyl diether of glycerol, alpha, alpha' disecondary amyl diether of glycerol, alpha isopropyl, alpha' secondary hexyl diether of glycerol, alpha secondary butyl, alpha' secondary hexyl diether of glycerol, alpha secondary butyl, beta secondary butyl diether of glycerol, alpha secondary butyl, beta isopropyl diether of glycerol, alpha, alpha' diisopropyl diether of beta-methyl glycerol, alpha, alpha' disecondary butyl diether of beta-methyl glycerol, alpha, beta diisopropyl diether of beta-methyl glycerol, the symmetrical and mixed disecondary diethers of the beta-ethyl-, beta-propyl-beta-butyl and the like glycerols, the symmetrical and mixed disecondary diethers of the alpha substituted glycerols, and the like and their homologues, analogues and suitable substitution products. The remaining hydroxy group of the above-listed disecondary diethers of glycerols may be substituted by the alkoxy, aralkoxy or aryloxy group of a primary or tertiary alcohol or of a phenolic compound, or it may be substituted by the negative radical of an organic carboxylic acid.

Trisecondary triethers of glycerols, which are within the scope of the invention, include, among others, the following: triisopropyl triether of glycerol, trisecondary butyl triether of glycerol, trisecondary amyl triether of glycerol, trisecondary hexyl triether of glycerol, alpha, alpha' diisopropyl, beta secondary butyl triether of glycerol, alpha, beta diisopropyl, alpha' secondary butyl triether of glycerol, alpha, alpha' diisopropyl beta secondary amyl triether of glycerol, alpha, alpha' disecondary butyl, beta isopropyl triether of glycerol, and the like trisecondary triethers of the glycerols as beta-methyl glycerol, beta-ethyl glycerol, beta-propyl glycerol, alpha-methyl glycerol, alpha, alpha' dimethyl glycerol, etc., wherein the hydroxy groups are substituted by the same or different alkyl radicals of aliphatic secondary alcohols.

A particularly useful and readily prepared group of the secondary ethers of polyhydric alcohols comprises the secondary monoethers, the disecondary diethers wherein one of the secondary alcohol radicals contains at least four carbon atoms, and the trisecondary triethers of glycerol.

The secondary monoethers of glycerol may be represented by the formulae:

R—O—CH$_2$—CHOH—CH$_2$OH and

HOCH$_2$—CHOR—CH$_2$OH wherein R represents the alkyl radical of an aliphatic secondary alcohol.

The disecondary diethers of glycerol with which we are principally concerned may be represented by the formulae:

R—O—CH$_2$—CHOH—CH$_2$—O—R'

HO—CH$_2$—CHOR—CH$_2$OR' and

HO—CH$_2$—CHOR'—CH$_2$OR wherein R and R' are the same or different secondary alkyl radicals, R representing the alkyl radical of an aliphatic secondary alcohol, and R' representing the alkyl radical of an aliphatic secondary alcohol containing at least four carbon atoms to the molecule.

The trisecondary triethers of glycerol may be represented by the formula

R—O—CH$_2$—CH(OR')—CH$_2$—O—R'' wherein R, R', and R'' may be the same or different and represent alkyl radicals of aliphatic secondary alcohols.

In our United States Patent No. 2,067,385, which issued January 12, 1937, with which the parent application of which this application is a division was copending and a continuation-in-part thereof, we have described and claimed a process for the preparation of secondary polyhydric alcohol ethers, which process comprises reacting a secondary-base olefine, as propylene, secondary butylene, secondary amylene, etc., with an aliphatic polyhydric alcohol in the presence of a condensing agent, preferably an acid-acting condensing agent, which promotes a condensing action between the olefine and the alcohol. This process is suitable for the production of some of the secondary ethers of trihydric alcohols herein described. We have, in addition, discovered that there are other methods of preparing such secondary ethers of trihydric alcohols.

One of such other methods comprises reacting a halohydrin of the trihydric alcohol to be etherified with an alkali metal salt of the desired aliphatic secondary alcohol. For example, if it is desired to prepare the alpha isopropyl ether of glycerol, dichlorhydrin may be reacted with the isopropyl alcoholate of sodium to yield the isopropyl ether of glycidol which can be readily hydrated to the desired alpha isopropyl monoether of glycerol. This manner of preparing the secondary ethers of trihydric alcohols is described in detail in the illustrative examples.

The invention is illustrated but not limited by the following examples which describe the preparation of representative secondary ethers of trihydric alcohols. The parts are by weight.

*Example I*

About 54.5 parts of sodium were dissolved in about 1000 parts of secondary butyl alcohol. This solution was stirred and heated at about 70° C., while about 156 parts of dichlorhydrin were added. When all of the dichlorhydrin had been added, the stirring was continued and the mixture heated at about 90° C. for about 1.5 hours. At the end of this time, the mixture was cooled, filtered to separate sodium chloride, and distilled under a subatmospheric pressure. Two reaction products were isolated.

The lower boiling product (B. P. 52° C. at 14 mm. of mercury) was the secondary butyl ether of glycidol of the formula

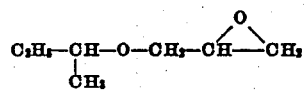

This novel compound has a specific gravity $\left(d\dfrac{20}{4}\right)$ of 0.9137

It is a good nitrocellulose solvent. A part of the secondary butyl ether of glycidol was heated with water in the presence of a mineral acid and hydrated to the novel alpha secondary butyl glycerol ether of the formula

C$_2$H$_5$—CH—O—CH$_2$—CHOH—CH$_2$OH
         |
         CH$_3$

A good yield of this ether was obtained.

The higher boiling fraction separated by vacuum distillation of the initial reacted mixture was the novel alpha, alpha' disecondary butyl diether of glycerol of the formula

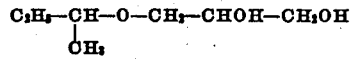

This compound boils at a temperature of 115° C. under a pressure of 14 mm. of mercury, and it has a specific gravity $\left(d\dfrac{20}{4}\right)$ of 0.9125

This ether is a solvent for nitrocellulose. It is only slightly soluble in water.

*Example II*

About 51 parts of sodium were dissolved in about 750 parts of secondary amyl alcohol. This solution was stirred and maintained at room temperature while about 155 parts of dichlorhydrin were added slowly over a period of about one hour. After all of the dichlorhydrin had been added, the temperature of the mixture was raised to about 90° C. and the stirring continued for about one hour. At the end of this time, the cooled mixture was distilled under a subatmospheric pressure to separate the reaction product from the precipitated salt. The first distillate was then redistilled under a subatmospheric pressure to recover the pure product. The product was the secondary amyl ether of glycidol of the formula

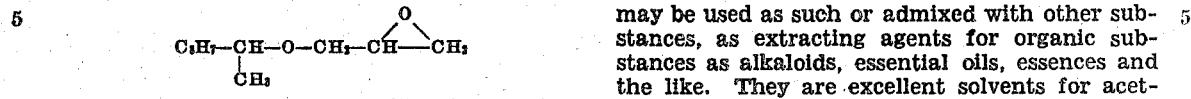

This novel compound has a boiling temperature of 74° C. under a pressure of 16 mm. of mercury. Its specific gravity $\left(d\frac{20}{4}\right)$ is 0.9056

The glycidol ether possesses a limited water solubility and it is a good solvent for nitrocellulose.

The secondary amyl ether of glycidol was hydrated to the corresponding alpha secondary amyl ether of glycerol by the following method: About 40 parts of the glycidol ether, 400 parts of water and 0.15 part of sulphuric acid were mixed and the mixture stirred and heated under reflux for about five hours. At the end of this time the reaction mixture was neutralized and distilled under a subatmospheric pressure. The alpha secondary amyl ether of glycerol

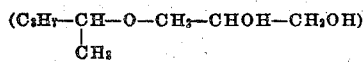

was obtained in good yield. This compound boils at 102° C. under a pressure of 3 mm., and it has a specific gravity $\left(d\frac{20}{4}\right)$ of 0.9836

The novel secondary ethers of trihydric alcohols are for the most part colorless, more or less viscous liquids of high boiling temperature and negligible vapor pressure at room temperature. The secondary ethers, particularly the secondary monoethers, may be used as substitutes for glycerol in a great many processes. In numerous cases they are more advantageously used than the glycerols because of their lower hygroscopicity and greater solvent power for certain materials. For example, the secondary ethers of trihydric alcohols comprehended by the invention are useful as ingredients of textile treatment media, as reagents in the manufacture of explosives, as perfume fixatives, as constituents of lubricating compositions, as constituents of anti-freeze mixtures for use in the cooling systems of internal combustion engines, as heat-transferring media in indirect heat conduction systems, as reactants in the preparation of resins, etc.

The novel trihydric alcohol ethers are particularly useful as solvents. Many of them are good nitrocellulose solvents and are useful as plasticizers for cellulose ethers and esters. They may be used as such or admixed with other substances, as extracting agents for organic substances as alkaloids, essential oils, essences and the like. They are excellent solvents for acetylene, and they may be used as scrubbing agents to recover acetylene from gaseous mixtures. The glycerol ethers, particularly those of lower molecular weight, are excellent solvents for acidic gases, particularly hydrocyanic acid. Further, the secondary ethers of trihydric alcohols are useful intermediates in the preparation of trihydric alcohols and trihydric alcohol derivatives.

This aplication is a division of our copending application, Serial No. 115,636, filed December 12, 1936, whch was copending with application, Serial No. 722,567, filed April 26, 1934, which issued as United States Patent 2,067,385 on January 12, 1937.

The foregoing description has been made rather detailed for clearness of understanding only, and no unnecessary limitations should be understood therefrom, but the appended claims should be construed as broadly as possible in view of the prior art.

We claim as our invention:

1. An aliphatic trisecondary triether of a trihydric alcohol.
2. An aliphatic triseconary triether of a glycerol.
3. An aliphatic trisecondary triether of glycerol.
4. An aliphatic triether of a glycerol wherein at least one of the alkoxy groups is the alkoxy group of a secondary aliphatic alcohol.
5. The glycerol triether of the formula

wherein R, R₁ and R₂ are the alkyl radicals of aliphatic alcohols at least one of which is an aliphatic secondary alcohol.

6. The glycerol trisecondary triether of the formula

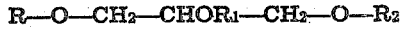

wherein R, R₁ and R₂ represent the alkyl radicals of aliphatic secondary alcohols.

7. The triisopropyl triether of glycerol.
8. The trisecondary butyl triether of glycerol.

THEODORE W. EVANS.
EDWIN F. BULLARD.